May 12, 1970     B. C. BENJAMIN     3,511,260
DISTRIBUTOR ADVANCE VACUUM VALVE ASSEMBLY
Filed Oct. 18, 1965
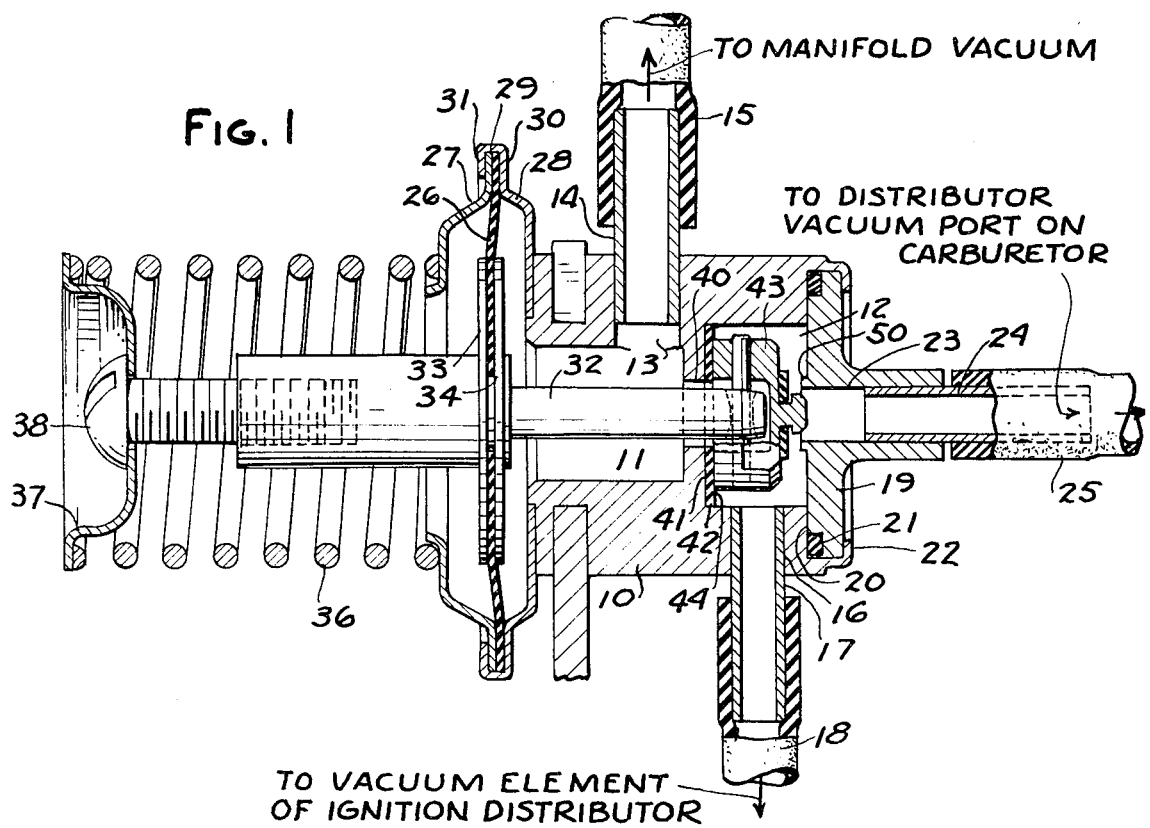
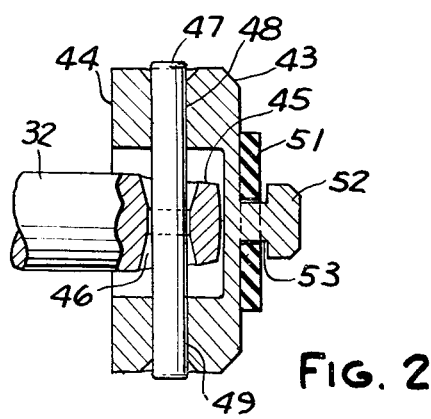
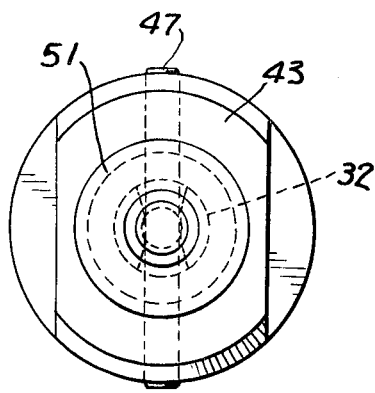
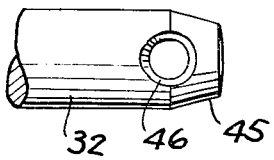
INVENTOR.
BENJAMIN C. BENJAMIN
BY Barnes, Kisselle, Raisch & Choate
ATTORNEYS

United States Patent Office 3,511,260
Patented May 12, 1970

1

3,511,260
DISTRIBUTOR VACUUM ADVANCE VALVE
ASSEMBLY
Benjamin C. Benjamin, Flint, Mich., assignor to F. & E.
Manufacturing Co., Detroit, Mich., a corporation of
Michigan
Filed Oct. 18, 1965, Ser. No. 496,883
Int. Cl. F02p 5/04
U.S. Cl. 137—119                                    3 Claims

ABSTRACT OF THE DISCLOSURE

A valve assembly including a housing having a pair of chambers with an opening therein. A passage extends from one of said chambers to the exterior and a pair of passages extends from the other of said chambers to the exterior. A diaphragm is associated with the first chamber and is operable to move a valve into engagement with a valve seat adjacent the opening providing communication between the chambers. The valve is swivelly mounted for angular movement on a shaft associated with the diaphragm.

This invention relates to a valve assembly and particularly to a valve assembly that is adapted to be used in conjunction with the distributor of an automobile engine for advancing the spark.

It is an object of the invention to provide a valve assembly which is operable to advance the spark during deceleration, which is efficient and which is low in cost.

It is a further object of the invention to provide such a valve assembly that includes novel means for insuring a seal as may be required in certain operative positions.

In the drawings:

FIG. 1 is a longitudinal sectional view through a valve assembly embodying the invention.

FIG. 2 is a fragmentary sectional view on an enlarged scale of a portion of the valve shown in FIG. 1.

FIG. 3 is an end view of the portion of the valve shown in FIG. 2.

FIG. 4 is a fragmentary plan view of a stem or shaft utilized in the valve shown in FIGS. 1-3.

Referring to FIG. 1, the valve assembly embodying the invention comprises a body or housing 10 which is formed with a chamber 11 communicating with one end of the body and a chamber 12 communicating with the other end of the body. A first passage 13 extends radially from chamber 11 and a tube 14 is press fitted in the passage 13. A flexible tube 15 is stretched over tube 14. A second radial passage 16 extends from the second chamber 12 to the exterior of the housing 10 and a tube 17 is press fitted in the body. A flexible tube 18 is stretched over tube 17.

A cap 19 seals the end of the chamber 12 by engaging a shoulder 20. An O-ring 21 is provided to insure a good seal and the flange 22 of the body is bent over to retain the cap 19 in position. The cap 19 has a third axial passage 23. A tube 24 is press fitted in the passage 23 and a flexible tube 25 is stretched over tube 24.

The end of the first chamber 11 on housing 10 is closed by a pressure responsive element such as a diaphragm 26 which is supported within the halves 27, 28 of a sheet metal housing. The periphery of diaphragm 26 is clamped between the flanges 29, 30 and the end 31 of the flange 30 is turned over flange 29. Diaphragm 26 supports a shaft or stem 32 by washers 33, 34 that are clamped over the inner periphery of the diaphragm within shoulders on the shaft 32. One housing half 28 is welded or brazed to the body 10. The other housing half 27 is open to the atmosphere so as to apply atmospheric pressure to the other side of the diaphragm. A compression spring 36 is interposed between the housing half 27 and a shaped washer 37 that

2 is retained on the end of shaft 32 by a screw 38. Threading of the screw 38 into and out of the shaft varies the spring tension. By this arrangement, the shaft is yieldingly urged to the left as shown in FIG. 1.

As shown in FIG. 1, an opening 40 provides communication between chambers 11, 12. A flat valve seat 41, which extends substantially radially is provided at the area of juncture of opening 40 and chamber 12 and supports an annular resilient gasket 42 of suitable material such as synthetic rubber which will withstand the action of oil and combustible gases. A valve 43 is mounted on the end of the shaft 32 and has a substantially flat sealing surface 44 that engages the gasket 41 and provides a seal.

In accordance with the invention as shown in FIGS. 2 and 3, the valve 43 is swivelly mounted on the end of the shaft 32 in such a manner as to permit relative movement between the end of the shaft 32 and the valve 43 to accommodate any misalignment and insure a good seal. This swivel mount is such that when the valve surface 44 is in engagement with the gasket 42, there is no fluid leakage through the valve 43.

More specifically, the end of the shaft 32 is tapered as at 45 and is provided with a radial opening 46, the ends of which diverge outwardly toward the outer surface of the shaft 32. A pin 47 extends through the passage 46 and swivelly mounts the valve on the shaft 32. The ends of the pin 47 are press fitted in radial openings 48, 49 in valve 43 so that there is no leakage through the openings 48, 49.

A secondary seal is provided between a valve seat formed by an annular shoulder 50 at the area of juncture of the passage 23 and chamber 12. It is adapted to be engaged by a resilient washer 51 that is mounted on the valve 43 and held in position by an enlarged head or button 52 that defines an annular groove 53 in which the resilient washer 51 is positioned.

The valve assembly is adapted to be used in connection with carburetion systems of automotive vehicles wherein the spark is retarded in order to minimize the formation of hydrocarbons at idle. In one type of such system, the port of the vacuum advance is closed during deceleration so that there may be a possibility that with a retarded spark during deceleration greater hydrocarbon emissions will ocur. The valve assembly embodying the invention has particular utility in connection with such a system to provide for spark advance during deceleration. For example, the first passage 13 can be connected to manifold vacuum, the second passage 16 can be connected to vacuum element of the ignition distributor and the third passage 23 can be connected to the distributor vacuum port on the carburetor.

In use the spring 36 normally urges the valve 43 against the gasket 42. Upon certain decelerations the manifold vacuum increases to a point sufficient to create a force high enough on the diaphragm 26 to overcome the force of the spring 36. This action moves the valve 43 away from the valve seat 41 and thereby provides communication of vacuum directly to the vacuum element of the ignition distributor. At the same time, the secondary sealing gasket 51 moves against the annular seat 50 to close off communication to the vacuum port on the carburetor. Thus the spark is advanced during deceleration.

I claim:

1. In a valve assembly, the combination comprising a housing having a pair of chambers, an opening providing communication between said chambers, said housing having a first passage extending from said first chamber to the exterior of said housing, said housing having second and third passages extending from said second chamber to the exterior of said housing, pressure responsive element associated with said first chamber, a shaft fixed to said pressure responsive element, said housing having a valve seat in said second chamber adjacent the opening providing communication between said first and second chambers, a valve, means for swivelly mounting said valve for angular movement on the end of said shaft for engagement with said valve seat, and spring means yieldingly urging said pressure responsive element in a direction to bring said valve into engagement with said valve seat, said means swivelly mounting said valve on said shaft comprising a radial opening in said shaft, a pin extending through said valve and said opening in said shaft, the ends of said pin which extend through said valve being press fitted in said valve to prevent leakage of gases therethrough.

2. In a valve assembly, the combination comprising a housing having a pair of chambers, said housing having an opening providing communication between said chambers, said housing having a first passage extending from said first chamber to the exterior of said housing, said housing having second and third passages extending from said second chamber to the exterior of said housing, a diaphragm associated and exposed on one side to said first chamber and exposed on the other side to ambient pressure, a shaft fixed to said diaphragm and extending through said first chamber, through said communicating opening into said second chamber, said housing having a substantially flat valve seat in said second chamber at the area of juncture of said communicating opening and said second chamber, a resilient gasket on said valve seat, a valve having a substantially flat annular valve surface for engaging said gasket, and means for swivelling said valve for angular movement on the end of said shaft in a manner to provide a fluid-tight seal when said valve surface engages said valve seat, said means swivelly mounting said valve on said shaft comprising a radial opening in said shaft, a pin extending through said valve and said opening in said shaft, the ends of said pins which extend through said valve being press fitted in said valve to prevent leakage of gases therethrough.

3. In combination, a pair of axially spaced valve seats defining a corresponding pair of ports, an axially reciprocable valve plunger extending axially through one of said ports into the space between said valve seats, valve means in said space adapted to seat selectively at either of said valve seats to close the corresponding port, and means for mounting said valve means on said plunger for limited universal pivoting thereon to accommodate cocking of said plunger relative to said valve means when the latter is seated at either of said valve seats including an axial hole in said valve means oversize with respect to said plunger and having the latter extending loosely therein and also including interengaging means carried by said plunger and valve means for selectively shifting the latter to seat at one or the other of said valve seats upon axial shifting of said plunger in one direction or the opposite, said means for mounting said valve means on said plunger comprising an hourglass shaped pin hole extending diametrically through said plunger, and a pin extending diametrically through said hourglass shaped pin hole and into mating diametrically opposed pin holes in said valve means, said pin frictionally engaging said valve means within the latter pin holes to seal the same closed and to secure said pin to said valve means, said pin also being closely confined pivotally by said plunger at the restricted region of said hourglass shaped pin hole to limit axial movement of said plunger relative to said pin while enabling said limited universal pivotal movement of said valve means to the extent of the pivotal movement of said pin within said hourglass shaped pin hole.

References Cited

UNITED STATES PATENTS

| | | | |
|---|---|---|---|
| 814,679 | 3/1906 | Doman | 251—86 X |
| 1,638,162 | 8/1927 | Kirschbraun et al. | 251—86 |
| 1,842,332 | 1/1932 | TePas | 137—625.5 X |
| 2,123,814 | 7/1938 | Summers | 137—625.27 |
| 3,252,451 | 5/1966 | Sarto | 123—117.1 |
| 3,268,202 | 8/1966 | Murray et al. | 251—86 |
| 1,799,667 | 4/1931 | Ziegler | 251—87 |
| 1,859,357 | 5/1932 | Elder | 137—119 |
| 2,382,562 | 8/1945 | Harvey | 251—86 |
| 2,888,036 | 5/1959 | Reppert | 137—527.4 |
| 2,899,980 | 8/1959 | Loebel et al. | 251—86 X |
| 2,986,899 | 6/1961 | Schenk et al. | 137—111 X |
| 3,173,653 | 3/1965 | Valentine | 137—102 X |
| 3,322,142 | 5/1967 | Baumann | 251—61 X |

FOREIGN PATENTS 21,206      1901      Great Britain.

ALAN COHAN, Primary Examiner

D. J. ZOBKIW, Assistant Examiner

U.S. Cl. X.R.

123—117.1; 137—625.27, 625.5; 251—86, 364